United States Patent
Maucher

[11] 3,900,091
[45] Aug. 19, 1975

[54] CLUTCH RELEASE

[75] Inventor: Paul Maucher, Sasbach, Germany

[73] Assignee: Lamellen und Kupplungsbau GmbH, Buhl, Germany

[22] Filed: May 10, 1973

[21] Appl. No.: 359,055

[30] Foreign Application Priority Data
Apr. 29, 1972 Germany.......................... 2221231

[52] U.S. Cl................ 192/98; 192/110 B; 308/233; 308/236
[51] Int. Cl......................... F16c 19/00; F16c 33/30
[58] Field of Search.............. 192/98, 110 B, 109 A; 308/233, 236, 194, 234

[56] References Cited
UNITED STATES PATENTS

| | | | |
|---|---|---|---|
| 1,431,552 | 10/1922 | White............................. | 192/110 B |
| 2,995,406 | 8/1961 | Pitner.................................. | 192/98 |
| 3,317,014 | 5/1967 | Pitner.................................. | 192/98 |
| 3,365,040 | 1/1968 | Pitner.................................. | 192/98 |
| 3,416,637 | 12/1968 | Maurice............................... | 192/98 |
| 3,625,327 | 12/1971 | Birdsey............................ | 192/110 B |

FOREIGN PATENTS OR APPLICATIONS

| | | | |
|---|---|---|---|
| 1,450,069 | 3/1969 | Germany............................. | 308/234 |
| 268,081 | 8/1950 | Sweden.............................. | 308/233 |

Primary Examiner—Samuel Scott
Assistant Examiner—Allan R. Burke
Attorney, Agent, or Firm—Herbert L. Lerner

[57] ABSTRACT

A clutch release for motor vehicles or the like includes a clutch operating means and a clutch disengaging means and a clutch disengaging means. A bearing is operatively associated with the clutch disengaging means for operating the latter. An energy storage device provides a biasing force urging the bearing means into contact with a stop. The clutch operating means is operable to lift the bearing means from the stop whereby the bearing means is moveable in a radial direction for centering. A positive connection is provided between the bearing and the stop when the bearing and stop are biasingly urged into engagement with one another.

15 Claims, 7 Drawing Figures

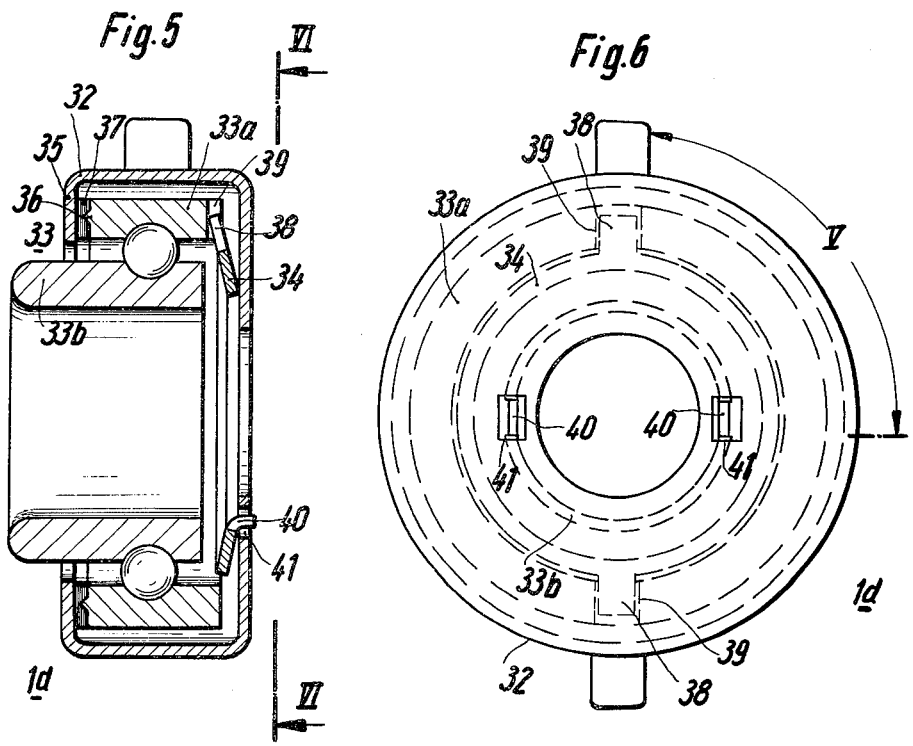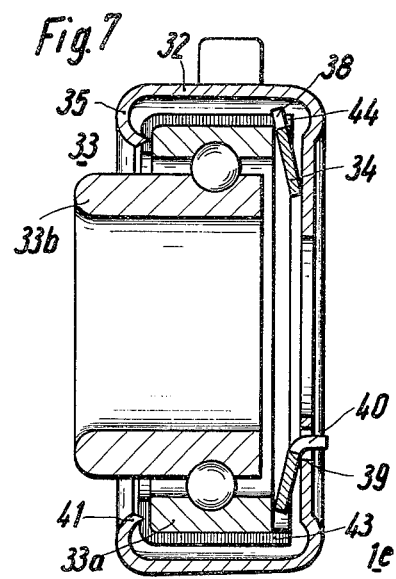

CLUTCH RELEASE

This invention relates to a clutch release and more particularly to motor vehicle clutches with an engagement element adopted to be engaged by a clutch operating means such as a disengaging fork and an engagement area for engaging a clutch disengagement means such as cup spring prongs. Suitable levers and a pressure member are also provided. The engagement area is provided at a bearing ring which is intended to rotate. The bearing which is preferably a ball bearing, is pressed via its other bearing ring against a stop provided at the release by an energy storage device acting on the clutch disengagement means and centering of the bearing on the axis of the clutch is provided in that the bearing can be lifted off the stop by a limited amount when the clutch is operated and can move in a radial direction relative to the engagement element by the clutch operating means.

In such clutch releases, for example, as have become known from the German Non-Prosecuted Pat. Application 1,775,412, an objective is to provide assurance that in so-called centrally guided clutch releases, the displacement of the axes between the revolving clutch disengagement means and the revolving bearing ring is equalized after the first operation of the clutch as the bearing is to be self-centering. In the case of known pivot clutch releases, an objective is to provide assurance that the bearing is self-centering and remains in this position when the release is lifted off the clutch disengaging means such as the pressure member, the cup spring prongs, or the like. To this end, in these known clutch releases the non-rotating bearing ring is pressed by an energy storage device, namely, a cup spring, against a friction lining which is provided at a stop of the clutch release.

However, it has been found that this arrangement has a disadvantage in that with relatively slight vibrations in driving, the bearing shifts from the position which it first occupies and must be centered again in the next operation of the clutch, thereby causing considerable wear.

It is an object of the present invention to overcome these disadvantages in known prior art devices and to provide an arrangement which ensures that even under the heaviest vibration, the bearing remains in the position centered by the clutch disengagement means.

According to the invention, the aforementioned objective is achieved by providing that in clutch releases of the kind mentioned hereinabove, the energy storage device presses the non-rotating bearing ring against a stop, but where, however, a positive connection is effected between the non-rotating bearing ring and the stop as the non-rotating bearing ring contacts the stop. For this purpose, it is particularly advantageous if one of the parts, that is, the stop or the non-rotating bearing ring, is provided in the area of possible contact with an elastic material which is penetrated by a profiled surface on the other part. For this purpose, an annular plastic lining or material having suitable plastic or elastic deformation properties may be provided, for example on the stop and between the latter and the profile on the non-rotating bearing ring. The arrangement, of course, may also be made vice versa with the plastic material on the non-rotating bearing ring. The profile may consist of an annular, projecting, contoured surface with a wedge-shaped cross section facing the other part. Also the profile may consist of several contoured surfaces facing the other part, such as knurling, radial serrations, circular grooves or the like.

In clutch releases, in which the non-rotating bearing ring is held in the release condition by securing or mounting means provided at the clutch release, it may be particularly advantageous, according to a further embodiment of the invention, if positive contact exists between the securing or mounting means and the stop against which the energy storage device pushes the bearing via the non-rotating bearing ring in the disengaged position of the clutch. In such a case it may be preferable that the energy storage device does not engage the non-rotating bearing ring, as is the case in the forms known heretofore, but rather that the energy storage device engages the securing or mounting means. In this regard it may be advantageous to have the energy storage device act on that side of the securing or mounting means which faces away from the clutch disengagement means.

According to an additional feature of the present invention, the bearing is secured against rotation also in the condition lifted from the stop in the axial direction by means of a positive connection effective between the non-rotating bearing ring and parts of the clutch release, such as for example, the mounting for the bearing, or by a locking arrangement. Accordingly assurance is provided that even if the bearing grease becomes solidified due to low temperature or if impurities, not harmful in themselves, have penetrated into the bearing, the latter cannot co-rotate under any circumstances when the clutch is operated and wear cannot occur between the bearing ring not intended to rotate and the stop of the mounting or the like.

A particularly simple design may be obtained if a stop effective against rotation is provided between the mounting and the non-rotating bearing ring with such a stop permitting limited movement of the bearing in the axial as well as in the radial direction.

In addition there may preferably be provided between the bearing and the mounting or parts of the clutch release, two guides which are effective crosswise with respect to each other and perpendicularly to the axis with one of the guides being effective in one direction and the second one in the other direction. For this purpose, there may be provided at least one element which is effective between the stationary bearing ring and the mounting relative to which the bearing is movable in the one direction and the bearing together with this element in the other direction. It may be preferred that this intermediate element be made in the form of a washer or a platelet having preferably two projecting areas such as bumps, prongs, dogs, pins or the like which engage with or into matching slots or guides, for example sliding ways, on the non-rotating bearing ring. These projections on the intermediate element can protrude or extend in the radial or the axial direction and engage in matching slots or guides of the bearing ring and thus permit motion of the bearing relative to the mounting in the one direction or dimension.

The motion of the bearing relative to its mounting in the other direction or dimension, that is, at right angles thereto, may for example, be achieved by providing that the platelet engages with preferably tow protruding areas such as bumps, prongs, dogs, pins or the like in fitting guides or slots in the mounting.

It is particularly advantageous if the platelet fulfilling these functions is the energy storage device itself, and in particular, a cup spring.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 5 is a cross-sectional view taken along the line V in FIG. 6 and showing an alternate embodiment in which the bearing is secured against rotation.

FIG. 6 is a view looking along the line VI VII in FIG. 5.

FIG. 7 is a cross-sectional view similar to FIG. 6, of a further alternate embodiment which operates similar to that of the embodiment of FIG. 5 and 6.

Figure 1:
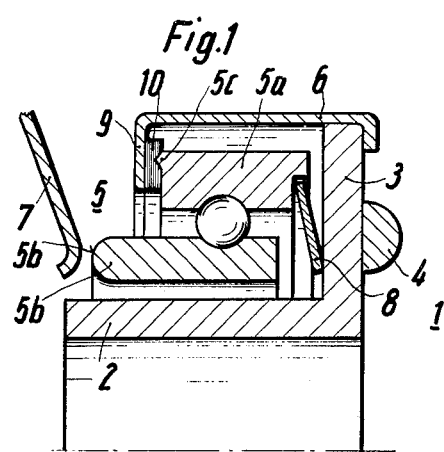
FIG. 1 is a cross-sectional view of a centrally operated clutch release according to one embodiment of the invention.

Referring to the drawings, FIG. 1 shows a centrally operated clutch release 1 having a sliding sleeve part 2 which has a radially extending flange 3 serving as the contact surface for the clutch operating means, for example, in the form of a disengaging fork 4 shown schematically in FIG. 1. A ball bearing 5 has a non-rotating bearing ring 5a which is not intended to rotate and a rotating bearing ring 5b which is held on the clutch release 1 within a mounting or sleeve 6. The revolving bearing ring 5b is provided with an engagement area 5b' for the clutch disengagement means which, in the illustrated embodiment, includes prongs 7 of a cup spring clutch.

A cup spring 8 bears on the one hand against the flange 3 and, on the other hand, against a recess in the non-rotaging bearing ring 5a. The cup spring 8 pushes the bearing in in the direction of a stop 9 at the mounting sleeve 6. At the stop 9, there is attached a ring 10 of plastically deformable material into which there penetrates a contoured surface 5c provided as a projection on the non-rotating bearing ring 5a, whereby the bearing is held in this contacting position with positive force and cannot be moved out of this position even under vibration.

In order to release the clutch, the clutch release 1 is moved by means of the disengaging fork 4 in the direction toward the cup spring prongs 7 and is moved against the biasing force of the cup spring 8, possibly until the non-rotating bearing ring 5a rests against the flange 3, which then also serves as a stop. When this occurs, the contoured surface 5c no longer completely contacts the plastic or elastic material 10 whereupon the impression in the material 10 caused by the contoured surface 5c is preferably reformed when complete contact is made again. When there is no complete contact the rotating disengagement means 7 centers the bearing in the radial direction relative to its axis during the first clutching in the operation of the motor vehicle. In the subsequent engagement operation, that is, when the clutch release 1 is moved to the right, the bearing is first clamped resiliently between the cup spring 8 and the clutch release means 7 and thus kept in the centered position until the motion of the release to the right has progressed so far that because of the biasing force of the cup spring 8, the contoured surface 5c of the ring 5a again penetrates into the elastic or plastic material 10 and it is thereby held in locked relation. After the bearing has once adjusted itself to the axis of the clutch after the first engagement operation, it remains in this position over the entire perios of use.

The clutch release 1 may also be used as a pivoted release by providing at the sleeve 6 suitable posts or mounting means for a fulcrumed disengaging fork. In such a case the guide area 2 is no longer necessary.

Figure 2:
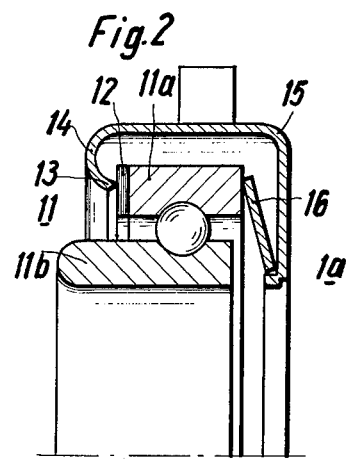
FIG. 2 is a cross-sectional view of a pivoted clutch release according to another embodiment of the invention.

By way of example there is shown in FIG. 2 on alternate embodiment using a pivoted clutch release 1a. However, in this embodiment the non-rotating ring 11a of the bearing 11 is provided with the elastic material 12 into which there penetrates a stop 14 which is contoured so as to have a wedge-shaped cross section 13 and which is formed as an integral part of the mounting sleeve 15 for the bearing 11. In FIG. 2 the cup spring 16 is secured at the clutch release and the bearing may be centered relative to the cup spring 16 in the radial direction.

Figure 3:
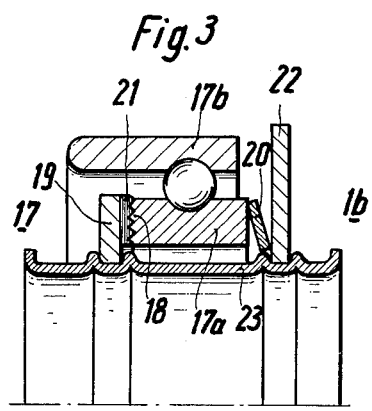
FIG. 3 is a cross-sectional view of a clutch release according to a further alternate embodiment.

In the clutch release 1b shown in FIG. 3, the non-rotating bearing ring 17a of the bearing 17 is provided with a multiplicity of profiled surfaces 18 which penetrate into the elastic material 21 upon contact. A stop 19 as well as a flange 22 for the clutch operating means are held in place on a guide sleeve 23 by means of beads formed on the sheet metal from which the guide sleeve 23 is made.

Figure 4:
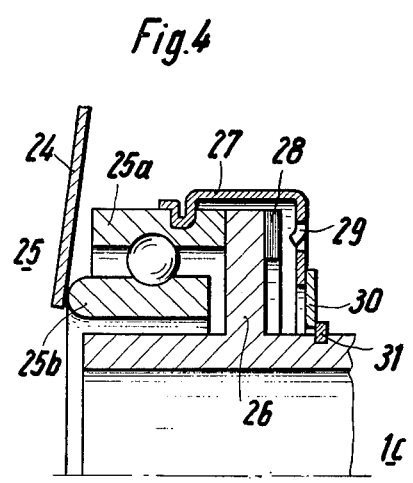
FIG. 4 is a cross-sectional view of a centrally guided clutch release which may be operated hydraulically.

FIG. 4 shows a centrally guided clutch release 1c which may be operable hydraulically. The position of the clutch disengagement means 24 indicates that the clutch is disengaged. The non-rotating bearing ring 25a of the bearing 25 rests against the support flange 26 while the rotating bearing ring 25b is in contact with the cup spring prongs 24. The bearing 25 is in a position centered on the axis of the clutch. The non-rotating bearing ring 25a is provided with a securing or mounting means 27 which is rolled into a groove in the bearing ring 25a. The securing or mounting means 27 extends over the flange or stop 26 at which a ring 28 of elastic material is provided. The securing and mounting means 27 includes a sleeve having several prongs 29 which are bent out in a direction toward the stop 26 or the elastic ring 28 and, in the position shown in FIG. 4, the prongs 29 are not engaged with the ring 28.

Engaging the securing and mounting means 27 is a cup spring 30 which is braced, on the other hand, against a snap ring 31 inserted into a groove in the clutch release and which, upon engaging the clutch, causes the prongs 29 to penetrate into the elastic material 28 whereby the bearing is then held in this position.

FIGS. 5 and 6 show another embodiment of the invention in which the bearing is additionally secured against rotation and also wherein, in the position lifted off the stop, there is retained the limited play for centering on the axis of the clutch.

The clutch release in 1d in FIGS. 5 and 6 is shown as a pivoted clutch release with its mounting 32 being in the form of a housing. Here again, a bearing 33 consists of a rotating bearing ring 33b and a stationary bearing ring 33a. The bearing is pushed or biased in a direction toward a stop 35 by means of a cup spring 34 and the non-rotating bearing ring 33a. The contoured surface 36 of the bearing ring 33a penetrates into a ring 37 of the elastic material.

In order to prevent the baring from co-rotating in a clutching operation, for example, at extremely low temperatures when the bearing grease solidifies, the cup spring 34 is designed as a rotation securing means. For this purpose the cup spring 34 has, in the one direction or dimension, two diametrically opposed prongs 38 which engage with making slots 39 in the non-rotating bearing ring 33a.

The bearing 33 can therefore be moved in the lifted condition in the verticlar direction, as seen from the observer's point of view, relative to the cup spring 38, and specifically, in the guideways or slots 39.

In the dimension or direction perpendicular to the aforementioned one direction, the cup spring 34 also has two diametrically opposite prongs 40 which engage in cutouts 41 in the housing 32. The cutouts 41 permit the cup spring 34 together with the bearing 33, to move through the narrow clearance between the prongs 38 and slots 39 in the horizontal direction, as seen from the observer's point of view.

Due to the fact that the bearing 33 can move, on the one hand, without the cup spring 34 in the one direction and, on the other hand, together with the cup spring 34 in the other direction perpendicular thereto, the bearing can 33 be displaced relative to the mounting 32 and the disengaging means in the radial direction into any position, without the possibility of rotation relative to the mounting.

FIG. 7 shows an alternate embodiment which is equivalent in its operation to the embodiment in FIGS. 5 and 6. Accordingly, elements having the same function are labelled with the same reference symbols in FIGS. 5 and 7. In FIG. 7, the mounting 32 also has a stop 35 which, however, has an approximately wedge-shaped profile 41 and which penetrates into a plastic cap 43 extending over the non-rotating bearing ring 33a. The cup spring 34, which pushes or biases the bearing 33 against the stop 35, has two diametrically opposite prongs or arms 38, as in the embodiment of FIGS. 5 and 6. The prongs or arms 38 engage or are received in guide slots 44 in the plastic cap 43. It will be seen that as in the case of the embodiment of FIGS. 5 and 6, the bearing 33 in the embodiment of FIG. 7 can thereby also execute the previously described movements relative to the cup spring 34 in the one direction or dimension.

In FIG. 7, the prongs 40 of the cup spring 34 engage or are received in slots 39 in the housing 32, whereby the bearing 33 together with the cup spring 34 is movable in the other direction or dimension perpendicular thereto.

I claim:

1. A clutch release for motor vehicles or the like comprising a clutch operating means and a clutch disengaging means, a bearing means operatively associated with said clutch disengaging means for operating the latter, a stop means for said bearing means, an energy storage means providing a biasing force urging said bearing means and stop means towards one another, said clutch operating means being operable to lift said bearing means from said stop by a limited amount whereby said bearing means are moveable in a radial direction to effect centering, and means providing a positive connection between said bearing means and said stop means when said bearing means and said stop means are biasingly urged into engagement with one another, said bearing means including a non-rotating ring part and said stop means having an engageable part, one of said parts having an elastic material thereon, and the other of said parts having a profiled portion which penetrates said elastic material when said stop means and bearing means are biasingly urged into engagement with one another.

2. A clutch release according to claim 1 wherein said profiled portion comprises an annular projecting contoured surface having a wedge-shaped cross section facing said other part.

3. A clutch release according to claim 1 wherein said profiled portion comprises a plurality of projecting contoured surfaces facing said other part.

4. A clutch release according to claim 1 wherein said bearing means includes a non-rotating ring element and a mounting means securing said non-rotating ring element on the clutch release, said means which provides a positive connection being disposed between said mounting means and said stop means.

5. A clutch release according to claim 4 wherein said energy storing device bears against said mounting means.

6. A clutch release according to claim 5 wherein said energy storage device engages on the side of said mounting means facing away from said clutch disengaging means.

7. A clutch release according to claim 1 wherein said bearing means includes a non-rotating ring element, and securing means positively securing said non-rotating ring element against rotation.

8. A clutch release according to claim 7 wherein said securing means includes a pair of engaging guide parts, one of said pair of guide parts being disposed substantially perpendicular to the other one of said pair of guide parts considered in a plane perpendicular to the axis of said bearing means.

9. A clutch release according to claim 7 including a mounting means on said clutch release, one of said pair of guide parts engaging said non-rotating ring element and being effective in one direction while the other one of said pair of guide parts engages said mounting means and is effective in another direction.

10. A clutch release according to claim 7 wherein said securing means includes at least one intermediate element operatively disposed between said non-rotating ring element and said mounting means, said intermediate element being movable in one direction relative to said mounting and in another direction relative to said bearing means.

11. A clutch release according to claim 10 wherein said intermediate element has the configuration of a washer.

12. A clutch release according to claim 10 wherein said intermediate element has the configuration of a platelet.

13. A clutch release according to claim 10 wherein said intermediate element has projecting parts, said non-rotating ring element having slots in which said projecting parts are received.

14. A clutch release according to claim 10 wherein said intermediate element has at least two projecting parts, said non-rotating ring element having mating slots in which said at least two projecting parts are received.

15. A clutch release according to claim 10 wherein said intermediate element is an energy storage device in the form of a cup spring.

* * * * *